United States Patent Office

Re. 24,003
Reissued May 17, 1955

24,003

IMPREGNATED FIBROUS BOARD AND METHOD OF MAKING SAME

Walter P. Ericks, Lockport, N. Y., assignor to The Upson Company, Lockport, N. Y., a corporation of New York No Drawing. Original No. 2,629,648, dated February 24, 1953, Serial No. 103,528, July 7, 1949. Application for reissue June 8, 1954, Serial No. 435,390

19 Claims. (Cl. 117—140)

Matter enclosed in heavy brackets [ ] appears in the original patent but forms no part of this reissue specification; matter printed in italics indicates the additions made by reissue.

This invention relates to dimensionally stabilized materials of cellulose fibers, particularly cellulose structural materials, and to methods for stabilizing such materials against dimensional change caused by change in the humidity of the environment surrounding such cellulose materials. More particularly, the invention relates to the stabilization of structural cellulose fiber boards as well as wood and paper and fabrics made of cotton, linen and other cellulose materials to render them more resistant to dimensional changes resulting from variations in the ambient humidity and to improve the strength of such products.

It is well known that materials made up entirely or predominantly of cellulose fibers expand and contract with variations in humidity in the ambient atmosphere, such materials suffering an increase in their dimension upon absorption of moisture from the atmosphere and a contraction when moisture is given up to the atmosphere upon a decrease in the humidity thereof. It is also well known that in articles wherein fibers are directionally oriented, such expansion and contraction usually occurs to the greatest extent in a direction perpendicular to the predominant direction of the fibers. The present invention is, therefore, adapted particularly in preventing or minimizing the dimensional change which occurs across the fibers with change in humidity in cellulose materials, although it also reduces dimensional change in the direction of the fibers with humidity change.

Various expedients have been heretofore employed for the purpose of dimensionally stabilizing materials made up predominantly of cellulose fibers as, for instance, plywood, wood boards, pulp products and combinations thereof, and solid paper boards. A degree of dimensional stabilization is obtained in the manufacture of plied or laminated articles by arranging the laminations with their fiber directions disposed angularly to one another rather than parallel. Although improvement in dimensional stabilization is obtained, the operation is laborious since it requires cutting and proper selection and assemblage of the plies.

It has also been suggested to densify the products under heavy pressure and to thereby set the cellulose fibers. Very expensive presses and extensive auxiliary equipment is required for this operation, and the product lacks low density and some of the flexibility desired for many uses of structural cellulose fiber board.

In my copending application Serial No. 627,966, filed November 10, 1945, and now abandoned, of which this is a continuation-in-part, I have disclosed that certain organic compounds having at least two hydroxyl groups in their molecules, particularly partial esters of polycarboxylic acids and polyhydric alcohols having at least one hydroxyl group in the residue derived from the polyhydric alcohol and at least one carboxyl group in the residue derived from the carboxylic acid, stabilize structures made up predominantly of cellulose fibers against expansion and contraction due to variation in atmospheric humidity. I have also disclosed in my copending application Serial No. 103,526 filed July 7, 1949, that other compounds having both hydroxyl and carboxyl groups, such as hydroxy carboxylic acids, are also effective stabilizers against such expansion and contraction. Also in my copending application Serial No. 103,527, filed July 7, 1949, I have disclosed that polyhydric alcohols have a similar stabilizing effect.

In accordance with the present invention, I have found that materials made up predominantly of cellulose fibers may be wholly or partially stabilized against dimensional change by introducing into such cellulose materials certain specified chemical compounds which also appear to have a particular affinity for the cellulose fibers. Compounds which produce dimensional stabilization are organic in nature and have at least two hydroxyl groups, at least one of which is a part of a carboxyl group, and possess certain other characteristics with respect to volatility. The series of compounds possessing dimensional stabilizing characteristics are the polycarboxylic acids.

In this case, as well as in that dealing with the partial esters and the hydroxy carboxylic acids mentioned above, at least one of the hydroxyl groups forms a part of a carboxyl group. The polycarboxylic acids are usually either soluble in water or in low molecular weight aliphatic alcohols or ketones or mixtures of these solvents. When in solvent solution, they rapidly penetrate into the fibrous structures, between the fibers and into the fiber cells, and in fact many of them rapidly penetrate such fibrous structures even in the absence of a solvent. In most cases, however, greater dimensional stability is obtained when the polycarboxylic acids are employed in solution in a solvent for impregnating the fibrous structures. Further properties and characteristics of the stabilizing chemicals will be more fully described hereinafter.

For purposes of illustration only, the invention will be described in detail in its application to the production of dimensional stability in laminated structural cellulose fiber boards. Such products are best exemplified upon the market by the structural building panels sold under the name "Upson Board." These cellulose fiber boards are generally manufactured from so-called fiber boards, that is, a fiber sheet with a caliper greater than about 0.030 inch. These fiber boards are assembled and bonded to one another to produce a laminated or plied article having, for instance, from two to about seven plies. The resulting laminated structural cellulose fiber board occurs in standard sized panels of from ⅛ inch to ⅜ inch or more in thickness, and of specified lengths and widths. The original cellulose board is manufactured from any conventional type of cellulose pulp stock as, for instance, ground wood fiber, chemical wood fiber, rag fiber and other conventional pulp fibers and mixtures thereof. The initial cellulose board which constitutes the individual ply may be made either upon a conventional cylinder machine, as is generally the case, or may be made upon a Fourdrinier machine. It will be understood, however, that the invention is of general application to structural cellulose materials as, for instance, fiber insulation board, sound absorbing board, table top board, structural board for the interior of an airplane, and the like.

The compounds employed to effect a stabilization in the structural cellulose fiber board against dimensional change induced by change in humidity may be introduced into the fibers from which the board is made, into the individual plies of the ultimate laminated structure or into the final laminated assembly itself. The choice of the place of introduction of the stabilizing compound and the manner in which it is to be introduced will be dictated by the type of fiber available and the type of structural panel to be produced.

Thus, when operating a closed board machine system wherein all water is recycled, the impregnating compound may be added to the beater or the stock prior to paper formation, as for instance in the head chest, assuming that a stabilizing compound has been chosen which is not readily subject to hydrolytic change at the temperature and pH of the pulp suspension. Or, the impregnating compound may be added at any other point in the wet end of the machine.

Where the individual cellulose structural board is already formed, the stabilizing compounds may be introduced into the board by immersing the board in the compound or a solution thereof or by impregnating the board with a spray containing the treating compound or by applying it with patting rolls, all conventional methods of impregnation. Where a laminated board has already been formed by bonding a plurality of individual boards together, the resultant laminated article may be immersed in the stabilizing compounds or a solution thereof and the impregnated board subsequently dried. The impregnation under such circumstances will generally be desirably performed by subjecting the board to vacuum, at which time occluded gases and volatile materials are removed from the board, then permitting the impregnating solution to flow into the evacuated chamber containing the board generally placed therein in an upright position and spaced apart, whereby the boards are enveloped in the solution which is, in effect, forced into the boards. This penetration of the solution may then be increased by relieving the vacuum and, if desired, raising the pressure above that of the atmosphere to enhance the speed and depth of penetration.

It is therefore an object of the present invention to provide a simple and inexpensive impregnating method for dimensionally stabilizing and strengthening structures made up substantially of cellulose and to produce dimensionally stabilized cellulose products.

In broad aspect, therefore, the invention comprehends the incorporation into structural cellulose fibrous materials of a polycarboxylic acid or mixture of such acids whereby the usual expansion and contraction of such cellulose materials is considerably minimized by reason of change in humidity conditions in the atmosphere surrounding such materials. This stabilizing effect is dependent upon the quantity of the stabilizing compound incorporated in the fibrous cellulose structural element. Effective dimensional stabilization has been accomplished by incorporating in the fibrous material from about 2 to 50% of the stabilizing compound based upon the weight of oven dried fiber. The exact quantity to be incorporated into the cellulose material will be dictated by the type of material, the type of polycarboxylic acid employed as a stabilizing compound, and the amount of the usual expansion or contraction which it is desired to remove. Thus, under certain conditions of use, the removal of so little as 12 or 15% of the normal expansion or contraction of a cellulose structural material may be suitable, while in other conditions of use, it may be desired to remove 50, 60 or 70% or more of the normal expansion or contraction encountered with a particular change in humidity conditions in the surrounding atmosphere.

The stabilizing compound may be incorporated into the cellulose fibers, whether the same be in fibrous form, unfibrated or felted fibrous form, by the employment of aqueous solutions, solutions in hydrophilic solvents, or mixtures thereof with water or in some instances may be incorporated without the employment of a solvent. However, the usual mode of incorporation will be to employ as an impregnating solution an aqueous or hydrophilic solution of the stabilizing compound.

The cellulose structural materials may be treated with the impregnated stabilizing material or solution thereof at substantially any desired temperature, although the usual impregnating temperatures will range between 20° C. and 50° C. However, temperatures as high as 100° C. may frequently be employed.

While the actual mechanism of the stabilizing action of the present invention for cellulose fibers is not fully understood, it is believed that their penetrating power and their fixation on and in the cellulose fibers is due to the particular molecular structure, that is to say, the presence of hydroxyl groups in both the cellulose and the stabilizing material.

After their incorporation in the cellulose material to be dimensionally stabilized, the stabilizing compounds show considerable resistance to removal by water and solvents, and it is believed, therefore, that probably there is some loose form of physico-chemical combination between the cellulose molecule and the stabilizing chemical. This resistance to removal of the stabilizer by water and solvents is quite marked, particularly if the impregnated cellulose products are heated to elevated temperatures as, for instance, between 100° C. and 200° C. It is further believed that the fixation of the stabilizing materials in and on the cellulose fiber may be due to the ability of the molecules of the stabilizing materials to react with each other, as well as with the cellulose, whereby polymerization takes place with the formation of long chain molecules of high molecular weight. The presence of carboxyl groups in the polycarboxylic acid suggests that, on heating, the hydroxyl groups of the polycarboxyl acid reacts with the hydroxyl groups of the cellulose to modify the chemical structure of the latter. It is believed that such modification of the cellulose results in increased dimensional stability of the cellulose structural material and also increases its strength and water resistance.

The fixation of the stabilizing compounds in and on the cellulose fibers can be enhanced by employing them in combination with thermosetting resins, which in their partially reacted state are soluble in the volatile, hydrophilic solvents for the stabilizers such as water, low molecular weight alcohols and ketones or mixtures thereof. The thermosetting resins, after setting, are believed to cover and protect the stabilizing materials in and on the cellulose fibers from attack by solvents. In this connection, it is further believed that the stabilizing materials penetrate farther into the cellulose fibers than the thermosetting resins, thus producing a protective coating of thermosetting resins.

The incorporation of thermosetting resins into the cellulose structure modifies to some extent the effect of the polycarboxylic acid in such a way that the hardness and water resistance of the resulting cellulose fiber structures impregnated by the stabilizers are increased. The requirement of the properties determined by the ultimate use of the resulting article will guide the selection of the stabilizing material and its use either separately or jointly with a thermosetting resin.

Suitable thermosetting resins which may be employed in combination with the stabilizing material of the present invention include phenol formaldehyde, urea formaldehyde, and melamine formaldehyde, which are soluble in the volatile, hydrophilic solvents employed. Any other thermosetting resins which in their partially reacted state have the property of being soluble in such solvents may also be employed. The resins become insoluble and infusible upon advancement and prevent attack by water or solvents upon the stabilizing materials and reaction products thereof deposited in and on the cellulose fibers. The amount of thermosetting resin may be varied within a considerable range, for example, between 5% and 50% of thermosetting resin in the final cellulose fiber product based on the dry weight of fiber.

The advantages gained in impregnating articles made up of cellulose fibers with polycarboxylic acid alone and in combination with thermosetting resins are shown by the following examples which are to be taken in an illustrative rather than a limiting sense. In securing the data for such examples the procedure outlined below was followed.

A board prepared on a cylinder paper machine from used news fiber was cut into strips measuring 0.051" x 2" x 12", extending in its largest dimension perpendicular to the predominating direction of fibers in the board. The strips were immersed into the impregnating solution kept at 50° C. and they were allowed to remain therein until the board was wetted to its center.

The time required for complete impregnation was within a range of 1 to 8 minutes, and on the average was about 4 minutes.

The dry strip was weighed before impregnation and, after the immersion in the impregnant, dried by heating at 125° C. for 30 minutes. From the difference in weight, the quantity of active ingredients deposited within the board, in and on the fibers, was determined. The strips were accurately measured dry and then conditioned in a humidifying chamber, kept at 90% relative humidity and 38° C. for about 48 hours, at the end of which period the strips had absorbed a maximum of moisture and usually showed no further increase in expansion. The total expansion of each of the unimpregnated control strip and of the impregnated and dimensionally stabilized strip was thus determined. The difference in the amount of expansion between the control strip and the stabilized strip represents the amount of normal expansion removed by means of the dimensional stabilization treatment; the difference in expansion between the two strips divided by the total expansion of the control strip times 100 is the percent of normal expansion removed.

The flexural strength of the strip was determined by the known method of applying a load required to break the strip.

EXAMPLE 1

Cellulose fiber boards were immersed for 4 minutes in solutions kept at 50° C. and containing 25%, 12.5%, 6.25% and 3.125% adipic acid dissolved in isopropanol. The impregnated boards were dried and heated for 20 minutes at 125° C. The resulting boards contained 30%, 16%, 12% and 8% of adipic acid, respectively, and showed a reduction in expansion and contraction in varying humidity of the atmosphere by 94%, 64%, 52% and 47%, respectively.

Cellulose fiber boards impregnated with isopropanol solutions containing 25%, 12.5%, 6.25% and 3.125% of a solute impregnant composed of equal quantities of adipic acid and liquid cresol-formaldehyde resin capable of advancement contained, after drying and heating, 24%, 11%, 7% and 4.1% of the above dimensional stabilizing impregnant and showed 84%, 56%, 42% and 34% of reduction in their contraction and expansion, respectively.

Impregnated and subsequently dried and heated boards containing 29%, 16%, 11% and 3.2% of stabilizing ingredients composed of equal quantities of adipic acid and urea-formaldehyde resin possessing the characteristic of advancement to an infusible, insoluble stage on heating, lost 81%, 49%, 24% and 17% of their contraction and expansion, respectively.

All impregnated boards possessed water-resistance, rigidity and strength superior to those of unimpregnated boards.

EXAMPLE 2

Cellulose fiber boards impregnated with sebacic acid solutions of various concentrations in isopropanol contained, after drying and heating, 4.2%, 9%, 16% and 27% of sebacic acid and showed losses of 42%, 61%, 91% and 95%, respectively, in their contraction and expansion in varying humidity of the atmosphere.

Impregnated and subsequently dried and heated boards containing 2.2%, 3.2%, 12% and 21% of active ingredienst composed of equal quantities of sebacic acid and liquid cresol-formaldehyde resin lost 35%, 47%, 61% and 82% of their contraction and expansion, respectively.

Impregnated and subsequently dried and heated boards containing 3.1%, 8.7%, 20% and 27% of active ingredients composed of equal quantities of sebacic acid and liquid urea-formaldehyde resin lost 27%, 61%, 85% and 93% of their contraction and expansion, respectively, in varying humidities of atmosphere.

EXAMPLE 3

Cellulose fiber boards were impregnated with solutions containing varying quantities of mixed aromatic polycarboxylic acids dissolved in a solvent composed of 20 parts of isopropanol and 80 parts of water. In accordance with the information of the supplier, the mixed aromatic acids were prepared by controlled oxidation of bituminous coal and contained three or more carboxyl groups per molecule of benzene. After evaporation of solvents and heating of the board for 15 minutes at 125° C. some of the boards lost more than 50% of their contraction and expansion. A substantial improvement in dimensional stability was also obtained when the dimensional stabilizing impregnant was composed of equal parts of mixed aromatic acid and urea-formaldehyde or cresol-formaldehyde resins. All impregnated and subsequently heated boards showed improvement in water-resistance and flexural strength.

EXAMPLE 4

Cellulose fiber boards were impregnated with solutions maintained at 50° C. and containing various concentrations of malonic acid alone and its combinations with either cresol-formaldehyde or urea-formaldehyde resin. After evaporation of solvents and heating all of the impregnated boards showed an improvement in dimensional stability, water-resistance and flexural strength.

EXAMPLE 5

Impregnating solutions were prepared by dissolving 50 parts of maleic anhydride in 150 parts of water kept at 50° C. Cellulose fiber boards were immersed into the solution and kept beneath its surface for 4 minutes, at the end of which period the impregnation was complete. The above solution was subsequently diluted with an equal weight quantity of water and another strip was impregnated with the solution obtained. The dilution and impregnation was then again repeated twice. The boards thus obtained contained, after drying and heating, various amounts of solids absorbed, ranging from 7% to 39%, and lost between 42% and 68%, respectively, of their contraction and expansion in varying humidity of the atmosphere.

Cellulose fiber boards were impregnated with solutions of various concentrations containing a dimensional stabilizing impregnant composed of equal parts of maleic anhydride and cresol-formaldehyde resin dissolved in a solvent composed of equal parts of isopropanol and water. The impregnated boards, after their drying and heating at 125° C. for 30 minutes, contained 4.2%, 12% and 14% of active ingredients and lost 14%, 36% and 43% of their original property of contracting and expanding in varying humidity of the atmosphere.

An improvement in dimensional stabilization was also obtained when the boards were impregnated with a solution prepared by dissolving maleic anhydrides and urea-formaldehyde resin in 20% aqueous isopropanol solution followed by heating of the impregnated boards at 125° C. for 30 minutes. All impregnated boards showed improvement in water-resistance and flexural strength.

A still further improvement in dimensional stability of impregnated boards was obtained when they were subjected to moderate pressure during their heat treatment, on the order of 200 lbs. per square inch.

EXAMPLE 6

Impregnating solutions containing 3.125%, 6.25% and 12.5% of fumaric acid were prepared by dissolving required quantities of the acid in isopropanol. Cellulose fiber boards impregnated with the above solutions contained 3.2%, 7.2% and 19.8% of fumaric acid, respectively, and showed losses in their original property of expanding and contracting in varying humidity of the atmosphere by 27%, 31% and 51%, respectively.

Impregnated and subsequently heated boards containing 2.1%, 4.2% and 12.5 of active ingredients composed of equal quantities of cresol-formaldehyde resin and fumaric acid lost, after their drying and heating, 30%, 36%, and 44% of their original property of contracting and expanding due to varying humidity conditions of the atmosphere.

Impregnated and subsequently heated boards containing various percentages of fumaric acid and urea-formaldehyde resin showed also improved dimensional stability.

All impregnated and heat treated boards possessed improved water-resistance and flexural strength.

EXAMPLE 7

Cellulose fiber boards impregnated with isopropanol solutions of succinic acid of various concentrations and containing, after heating, 5.2%, 9% and 17% succinic acid, lost 34%, 44% and 70%, respectively of their original property of contracting and expanding with variation of humidity in the surrounding atmosphere.

Cellulose fiber boards possessing improved dimensional stability were also obtained when they were impregnated with solutions containing succinic acid and urea-formaldehyde or cresol-formaldehyde resin and subjected to heat treatment thereafter. The boards thus treated also possess improved rigidity, water-resistance and flexural strength.

EXAMPLE 8

Impregnating solutions were prepared containing various concentrations of a solute composed of phthalic anhydride alone or in conjunction with one of the thermosetting resins, such as urea-formaldehyde or cresol-formaldehyde, and a solvent composed of 1 part of isopropanol and 4 parts of water. Cellulose fiber boards impregnated with these solutions possessed, after heating, improved dimensional stability, rigidity, water-resistance and flexural strength.

EXAMPLE 9

Impregnating solutions were prepared by dissolving in isopropanol required quantities of carbic anhydride to contain 3.125%, 6.25% and 12.5% of the latter.

Cellulose fiber boards impregnated with above solutions maintained at 50° C. and subsequently heat treated, contained 4.2%, 7.2% and 10% carbic anhydride and showed a reduction in contraction and expansion by 19%, 26% and 35%.

Cellulose fiber boards impregnated with solutions of various concentrations containing equal quantities of carbic anhydrides and cresol-formaldehyde resin dissolved in isopropanol contained 3.2%, 6.3% and 10% of above active ingredients and lost, after drying and heating for 30 minutes at 125° C., 22%, 28% and 35% of their original property of contracting and expanding in varying humidity of the atmosphere.

Where impregnation of the fibers is attempted prior to the preparation of a fiber board, economic and operational restrictions will narrow the selection of the polycarboxylic acids employed under such circumstances to those which are soluble in water. Comminuted cellulose fibers can be impregnated, however, with the stabilizing chemicals dissolved in organic solvents and structural members made therefrom show excellent dimensional stability under extremes of humidity conditions. This is shown in the following example:

EXAMPLE A

An aqueous pulp suspension of a consistency of 1% was prepared containing 18% concentration of adipic acid based on solution. Sheets of fiber board were prepared from this pulp, cut to size and the expansion determined by increasing the humidity from 0% to 90%. When this expansion was compared with that of board made from another portion of the same pulp without the presence of the stabilizer, it was found that a 13% content of the acid in the board, based on the weight of dry fiber, eliminated 45% of the normal expansion.

The same type of results were obtained when applying a solution of the stabilizing chemicals to the wet end of the paper making machine. This operation gives somewhat greater flexibility in the choice of stabilizing compound to be employed, as compared with addition to the beater or head chest, for example, since it is entirely practicable to use organic solvent solutions of the stabilizer, for instance, a solution made of equal parts water and isopropyl alcohol and containing 2% concentration of sebacic acid. When applying such a solution to the wet lap in amounts to provide 2.5% of acid in the board on a dry fiber basis, reductions in the normal expansion of 26% were obtained. At these lower dilutions, good results were obtained but, in many instances, operating technique will dictate the employment of relatively concentrated solutions when application is made to the wet lap.

Laminated cellulose structural fiber board may be impregnated with the dimensional stabilizer in any suitable fashion although immersion in the dimensional stabilizer or a solution thereof is recommended. In general, the temperature of the liquid in which the laminated cellulose structural fiber board is immersed will be at room temperature. Where a laminated product of an exceptionally high caliper is to be impregnated, the temperature of the liquid may be elevated to facilitate penetration. The laminated board may be soaked in the impregnating solution until such time as the desired quantity of dimensional stabilizer has been absorbed by or combined in some [physico-chemical] manner with the cellulose.

It may be found expedient when treating laminated cellulose structural fiber boards, or other cellulose elements which are relatively rigid, to pack the same in a chamber preferably in an upright position, having the boards spaced slightly apart to facilitate free circulation. It will also be found expedient to subject the chamber to vacuum whereby gases and other volatile materials, which interfere with free penetration of the solution into the board, are removed. Liquid containing the dimensional stabilizer is then admitted to the evacuated chamber containing the cellulose material and penetration throughout the body of the cellulose elements is facilitated. The impregnated boards are then removed from the solution and passed through any conventional form of drier.

Examples of polycarboxylic acids which may be employed in the present invention are oxalic, malonic, succinic, methyl-malonic, glutaric, propane-alpha-beta-dicarboxylic, ethylmalonic, butane-alpha-delta-dicarboxylic, adipic, beta - methyl - propane - alpha-beta - dicarboxylic, mixed polycarboxylic aromatic acids obtained by the controlled oxidation of bituminous coal, pimelic, diethylmalonic, suberic, azelaic, sebacic, decamethylene-dicarboxylic, tridecandioic, tetradecandioic, octadecandioic, nonadecandioic, fumaric, maleic, glutaconic, mesaconic, citraconic, muconic, alpha-carboxyglutaric, beta-carboxy-pimelic, camphoronic, aconitic, cyclopentendioic, 1,1-hexahydrophthalic, camphoric, phthalic, 2-carboxyphenylacetic, phenylsuccinic, benzalmalonic, naphthalene-dicarboxylic-1,8; diphenyl-carboxylic-2,2'; cyclopropane-tetracarboxylic - 1,1,2,2; naphthalene - tetracarboxylic - 1,4,5,8; dimer-abietic, dimer-linoleic, dimer-linolenic and the like and their anhydrides, such as phthalic, maleic, succinic and carbic (3,6-endomethylene-tetrahydrophthalic anhydrides.

Polycarboxylic acids, in general, have the requisite physical characteristics, for employment as stabilizers in accordance with the present invention. One of the important physical requirements of the stabilizer is that it be soluble in water or volatile water-miscible solvents such as lower aliphatic mono alcohols or ketones, or mixtures thereof. Also, in general, the greater its solubility in one of such volatile solvents, the greater its penetration into the cellulose fibers and the greater its stabilizing effect. The latter is true regardless of whether the stabilizing material is employed in solvent solution during impregnation.

Another important physical characteristic of the stabilizer is that it be substantially non-volatile under all temperature conditions likely to be encountered. That is to say, it should have a boiling point at least as high as 150° C. and preferably substantially higher at atmospheric pressure.

As to the solvents which may be employed for making up an impregnating solution, water is the preferred solvent and will ordinarily be employed alone if the stabilizing material is soluble therein in all portions. If necessary to obtain solution of the stabilizing material, volatile water-miscible organic solvents such as monohydroxyl aliphatic alcohols, containing three carbons or less or aliphatic ketones containing five carbons or less may be employed either alone or in admixture with each other or with water. By way of example, methyl, ethyl and propyl alcohols are particularly suitable and dimethyl, diethyl, methyl ethyl, methyl propyl or ethyl propyl ketones are also suitable. Such solvents or solvent mixtures should have a boiling point substantially below that of the stabilizing mixture, i. e., a boiling point not above approximately 105° C. at atmospheric pressure. Such solvents may be termed volatile hydrophilic solvents and for purposes of this application the term "volatile hydrophilic solvent" is defined as water, a water-miscible organic solvent or mixtures thereof having a boiling point not greater than 105° C.

In lieu of the polycarboxylic acid as the dimensional stabilizer, the esters of such acids with low molecular weight alcohols may be employed. It is believed that such esters, either by hydrolysis or alcoholysis with the cellulose, become effective for the physico-chemical combination believed to constitute the mechanism of the stabilizing action.

To summarize, the stabilizing materials in accordance with the present invention are either aromatic or aliphatic polycarboxylic acids or mixtures of such acids. In addition to such chemical requirement, the stabilizing materials should be soluble in all proportions with at least one of the volatile hydrophilic solvents as defined above and should have a boiling point at least as high as 150° C. Since solubility in volatile hydrophilic solvents depends upon several factors such as the number of hydrophilic groups, for example, carboxylic groups, the saturation of the compound and arrangement of carbons as well as the number of carbons, it is impossible to more definitely specify the nature of the effective compounds by chemical characteristics. The same situation exists as to the boiling point of the effective compounds.

The concentration of the impregnating solution can vary from 100% polycarboxylic acid in the case of low-viscosity polycarboxylic acids down to a concentration as low as 1%. In general, however, the best results are obtained when polycarboxylic acids are employed in a solution having a concentration ranging between approximately 5% and 60%. Also, in general, the dimensional stability obtained does not decrease proportionately with the decrease in concentration of the impregnating solution. When very dilute solutions are employed, a disproportionately high degree of stabilization is obtained. Thus the concentration of the polycarboxylic acid in the impregnating solution may range from approximately 1% to 100% and the amount of polycarboxylic acid retained in the fibrous material may range from approximately 1% to 50%, the preferred range being between approximately 3% and 50%.

The temperature of the impregnating solution during impregnation has an effect upon the results obtained. That is to say, the rate of penetration of the polycarboxylic acid into the fiber structure, the quantity of deposition of the acid in the fiber structure and the resulting improvement in dimensional stability not only depends upon the concentration of the polycarboxylic acid in the solution but also depends on the temperature of the impregnating solution. The higher the temperature at which impregnation is carried on, the greater the amount of polycarboxylic acid retained in the fibrous structure for a given concentration of the impregnating solution, and the more effective is the dimensional stabilization. The usual impregnating temperature will range between 20° and 60° C., although any temperature below that at which rapid vaporization of the impregnating solution takes place may be employed. Such temperature will not ordinarily be above 100° C.

The polycarboxylic acids deposited in the fibrous products exhibit considerable resistance to removal by water and solvents, particularly if the impregnated fibrous products are heated during drying or thereafter to temperatures between approximately 100° and 200° C. This indicates the possibility of a reaction between the cellulose and the polycarboxylic acids to modify the cellulose. Such modification of the cellulose is beneficially reflected by the increased dimensional stability and the increased strength and decreased water-absorptivity of the resulting product.

The affinity of the stabilizing materials of the present invention for cellulose fibers, their penetration powers and the reason for their fixation on and in the cellulose fibers is not fully understood. From a consideration of their molecular structure, it may be supposed that their affinity for cellulose fibers depends upon the presence of carboxylic groups in the polycarboxylic acid and the presence of hydroxyl groups in the cellulose. Their power of penetration is possibly due to the presence of balanced hydrophilic and hydrophobic groups in the molecules which is characteristic of surface active materials. These two properties apparently facilitate the deposition of the stabilizing materials in and on the cellulose fibers.

In processing the impregnated cellulose fiber materials, heating to a temperature which produces further reaction of the stabilizing material both with itself and with the cellulose is desirable in order to obtain the maximum effect of the present invention. Such temperatures will usually lie between 100° and 200° C. but in any case, the upper temperature should not exceed that at which scorching or volatilization of the stabilizing material may occur during the period of heating. The permissible upper temperature limit varies with the duration of heating and also with the type and quantity of impregnating substances in the cellulose material. The time of heating also varies with the temperature and the type and amount of stabilizing material or mixture with thermosetting resin retained in the cellulose fiber sheets but will usually range between 3 and 60 minutes. Such heating is ordinarily required to obtain the protective effects of the thermosetting resins when such resins are employed as part of the impregnant but substantial dimensional stabilization approaching that obtained after a heat treatment usually results from merely drying the impregnated structures at low temperatures, regardless of whether thermosetting resins are present.

My invention provides an impregnating solution and method for impregnating cellulose fiber materials which increases the rate and depth of penetration of the impregnating solution, improves the flexural strength of the cellulose fiber material and stabilizes it against contraction and expansion due to varying atmospheric humidity while at the same time reducing its absorption of water. Being acidic in nature, due to the carboxyl groups therein, the polycarboxylic acids of my invention are particularly adapted for use in combination with thermosetting resins, increasing the curing rate of the resins, eliminating the use of mineral acid catalysts for the resins and their detrimental effects, retarding the gelling of the resins and prolonging their useful life, while the resins, on the other hand, improve the fixation and water-resistance of the stabilizing compositions and reaction products thereof deposited in and on the cellulose fibers. In many instances, the polycarboxylic acids serve as powerful solvents for the thermosetting resins, thereby reducing the viscosity of the impregnating solutions, and beneficially affecting the impregnation of the cellulose fiber materials. Through such advantageous characteristics, my invention provides a method for impregnating and improving materials made up of cellulose fibers without the necessity of resorting to the time-consuming, laborious and expensive steps of arranging laminations with crossing fibers, or applying heavy pressures which densify, crush and injure the fiber structure.

What is claimed is:

1. The method of stabilizing fiber [wall] boards consisting essentially of felted cellulose pulp fibers against expansion and contraction with changes in atmospheric humidity, which process comprises, impregnating said boards substantially throughout said boards with *an impregnant consisting essentially of* between approximately 1% and 50% of at least one polycarboxylic acid, said polycarboxylic acid being in solution in a volatile hydrophilic solvent, and drying the resulting impregnated boards, said polycarboxylic acid being soluble in said volatile hydrophilic solvent and having a boiling point at least as high as 150 °C.

2. The method of stabilizing fiber [wall] boards consisting essentially of felted cellulose pulp fibers against expansion and contraction with changes in atmospheric humidity, which process comprises, impregnating said boards substantially throughout said boards with *an impregnating composition consisting essentially of* a solution in a volatile hydrophilic solvent of at least one polycarboxylic acid and drying the resulting impregnated boards, said polycarboxylic acid being soluble in said volatile hydrophilic solvent and having a boiling point at least as high as 150° C., and said solution having a concentration of said polycarboxylic acid between approximately 1% and 60%.

3. The method of stabilizing fiber [wall] boards consisting essentially of felted cellulose pulp fibers against expansion and contraction with changes in atmospheric humidity, which process comprises, impregnating said boards substantially throughout said boards with *an impregnating composition consisting essentially of* a solution in a volatile hydrophilic solvent of adipic acid and drying the resulting impregnated boards, said solution having a concentration of said adipic acid between approximately 1% and 60%.

4. The method of stabilizing fiber [wall] boards consisting essentially of felted cellulose pulp fibers against expansion and contraction with changes in atmospheric humidity, which process comprises, impregnating said boards substantially throughout said boards with *an impregnating composition consisting essentially of* a solution in a volatile hydrophilic solvent of sebacic acid and drying the resulting impregnated boards, said solution having a concentration of said sebacic acid between approximately 1% and 60%.

5. The method of stabilizing fiber [wall] boards consisting essentially of felted cellulose pulp fibers against expansion and contraction with changes in atmospheric humidity, which process comprises, impregnating said boards substantially throughout said boards with *an impregnating composition consisting essentially of* a polycarboxylic aromatic acid in solution in a volatile hydrophilic solvent, and drying the resulting impregnated boards.

6. The method of stabilizing fiber [wall] boards consisting essentially of felted cellulose pulp fibers against expansion and contraction with changes in atmospheric humidity, which process comprises, impregnating said boards substantially throughout said boards with *an impregnating composition consisting essentially of* a polycarboxylic aliphatic acid in solution in a volatile hydrophilic solvent, and drying the resulting impregnated boards.

7. The method of stabilizing fiber [wall] boards consisting essentially of felted cellulose pulp fibers against expansion and contraction with changes in atmospheric humidity, which process comprises, impregnating said boards substantially throughout said boards with *an impregnating composition consisting essentially of* a solution in a volatile hydrophilic solvent of a mixture of a thermosetting resin and at least one polycarboxylic acid, and drying and heating the resulting impregnated boards to cure said resin, said polycarboxylic acid and thermosetting resin being soluble in said volatile hydrophilic solvent, said polycarboxylic acid having a boiling point at least as high as 150° C., said solution having a concentration of said mixture between approximately 5 and 60% and said thermosetting resin constituting between approximately 5 and 50% of said mixture.

8. The method of stabilizing fiber [wall] boards, consisting essentially of felted cellulose pulp fibers against expansion and contraction with changes in atmospheric humidity, which process comprises, impregnating said boards substantially throughout said boards with *an impregnating composition consisting essentially of* a solution in a volatile hydrophilic solvent of a mixture of a thermosetting resin and adipic acid, and drying and heating the resulting impregnated boards to cure said resin, said thermosetting resin being soluble in said volatile hydrophilic solvent, said solution having a concentration of said mixture between approximately 5 and 60% and said thermosetting resin constituting between approximately 5 and 50% of said mixture.

9. The method of stabilizing fiber [wall] boards, consisting essentially of felted cellulose pulp fibers against expansion and contraction with changes in atmospheric humidity, which process comprises, impregnating said boards substantially throughout said boards with *an impregnating composition consisting essentially of* a solution in a volatile hydrophilic solvent of a mixture of a thermosetting resin and sebacic acid, and drying and heating the resulting impregnated boards to cure said resin, said thermosetting resin being soluble in said volatile hydrophilic solvent, said solution having a concentration of said mixture between approximately 5 and 60% and said thermosetting resin constituting between approximately 5 and 50% of said mixture.

10. The method of stabilizing fiber [wall] boards, consisting essentially of felted cellulose pulp fibers against expansion and contraction with changes in atmospheric humidity, which process comprises, impregnating said boards substantially throughout said boards with *an impregnating composition consisting essentially of* a solution in a volatile hydrophilic solvent of a mixture of a thermosetting resin and a polycarboxylic aromatic acid, and drying and heating the resulting impregnated boards to cure said resin, said thermosetting resin and said acid being soluble in said volatile hydrophilic solvent, said solution having a concentration of said mixture between approximately 5 and 60% and said thermosetting resin constituting between approximately 5 and 50% of said mixture.

11. As a product of manufacture, a fiber [wall] board consisting essentially of felted cellulose pulp fibers [and containing as an impregnant] *impregnated* substantially throughout *with an impregnant consisting essentially of*

[said boards] between approximately 1% and 50% of a polycarboxylic acid, said polycarboxylic acid being soluble in a volatile hydrophilic solvent and having a boiling point at least as high as 150° C.

12. As a product of manufacture, a fiber [wall] board consisting essentially of felted cellulose pulp fibers *impregnated* [and containing as an impregnant] substantially throughout [said boards] *with an impregnant consisting essentially of* between approximately 1% and 50% of a polycarboxylic aliphatic acid, said acid being soluble in a volatile hydrophilic solvent and having a boiling point at least as high as 150° C.

13. As a product of manufacture, a fiber [wall] board consisting essentially of felted cellulose pulp fibers *impregnated* [and containing as an impregnant] substantially throughout [said boards] *with an impregnant consisting essentially of* between approximately 1% and 50% of a polycarboxylic aromatic acid, said acid being soluble in a volatile hydrophilic solvent and having a boiling point at least as high as 150° C.

14. As a product of manufacture, a fiber [wall] board consisting essentially of felted cellulose pulp fibers *impregnated* [and containing as an impregnant] substantially throughout [said boards] *with an impregnant consisting essentially of* between approximately 3% and 50% of adipic acid.

15. As a product of manufacture, a fiber [wall] board consisting essentially of felted cellulose pulp fibers *impregnated* [and containing as an impregnant] substantially throughout said boards between approximately 3% and 50% of sebacic acid.

16. As a product of manufacture, a fiber [wall] board consisting essentially of felted cellulose pulp fibers *impregnated* [and containing as an impregnant] substantially throughout [said boards] *with an impregnant consisting essentially of* between approximately 1% and 50% of a mixture of a thermosetting resin and at least one polycarboxylic acid, said thermosetting resin and said polycarboxylic acid being soluble in a volatile hydrophilic solvent and said polycarboxylic acid having a boiling point at least as high as 150° C., the amount of said thermosetting resin being between approximately 5 and 50% of said mixture.

17. As a product of manufacture, a fiber [wall] board consisting essentially of felted cellulose pulp fibers *impregnated* [and containing as an impregnant] substantially throughout [said boards] *with an impregnant consisting essentially of* between approximately 1% and 50% of a mixture of a thermosetting resin and adipic acid, said thermosetting resin being soluble in a volatile hydrophilic solvent, the amount of said thermosetting resin being between approximately 5 and 50% of said mixture.

18. As a product of manufacture, a fiber [wall] board consisting essentially of felted cellulose pulp fibers *impregnated* [and containing as an impregnant] substantially throughout [said boards] *with an impregnant consisting essentially of* between approximately 1% and 50% of a mixture of a thermosetting resin and sebacic acid, said thermosetting resin being soluble in a volatile hydrophilic solvent, the amount of said thermosetting resin being between approximately 5 and 50% of said mixture.

19. As a product of manufacture, a fiber [wall] board consisting essentially of felted cellulose pulp fibers *impregnated* [and containing as an impregnant] substantially throughout [said boards] *with an impregnant consisting essentially of* between approximately 1% and 50% of a mixture of a thermosetting resin and mixed polycarboxylic aromatic acids, said thermosetting resin being soluble in a volatile hydrophilic solvent, the amount of said thermosetting resin being between approximately 5 and 50% of said mixture.

References Cited in the file of this patent or the original patent

UNITED STATES PATENTS

| | | |
|---|---|---|
| 1,857,690 | Mellanoff | May 10, 1932 |
| 2,050,197 | Sebrell | Aug. 4, 1936 |
| 2,155,731 | Mitchell | Aug. 25, 1939 |
| 2,185,477 | Thompson et al. | Jan. 2, 1940 |
| 2,190,331 | Mosher | Feb. 13, 1940 |
| 2,358,387 | Dreyfus et al. | Sept. 19, 1944 |
| 2,417,014 | Pollard | Mar. 4, 1947 |
| 2,530,175 | Pfeffer | Nov. 14, 1950 |